United States Patent
Arao et al.

(10) Patent No.: US 10,692,222 B2
(45) Date of Patent: Jun. 23, 2020

(54) WORK ANALYSIS DEVICE, WORK ANALYSIS METHOD, PROGRAM AND INFORMATION STORAGE MEDIUM

(71) Applicant: Broadleaf Co., Ltd., Tokyo (JP)

(72) Inventors: Takahide Arao, Tokyo (JP); Akira Ooka, Tokyo (JP); Mitsuru Amami, Tokyo (JP)

(73) Assignee: Broadleaf Co., Ltd., Tokyo (JP)

( * ) Notice: Subject to any disclaimer, the term of this patent is extended or adjusted under 35 U.S.C. 154(b) by 110 days.

(21) Appl. No.: 16/072,716

(22) PCT Filed: Dec. 22, 2016

(86) PCT No.: PCT/JP2016/088324
§ 371 (c)(1),
(2) Date: Jul. 25, 2018

(87) PCT Pub. No.: WO2017/130615
PCT Pub. Date: Aug. 3, 2017

(65) Prior Publication Data
US 2019/0035087 A1    Jan. 31, 2019

(30) Foreign Application Priority Data
Jan. 28, 2016  (JP) ................. 2016-014526

(51) Int. Cl.
*G06T 7/00* (2017.01)
*G06T 7/20* (2017.01)
(Continued)

(52) U.S. Cl.
CPC .............. *G06T 7/20* (2013.01); *G05B 19/418* (2013.01); *G06K 9/00335* (2013.01);
(Continued)

(58) Field of Classification Search
CPC ........ G06K 9/00; G06Q 10/0639; Y02P 90/02
(Continued)

(56) References Cited

U.S. PATENT DOCUMENTS

| | | | |
|---|---|---|---|
| 8,059,863 B2 * | 11/2011 | Shibuya ................... | G07C 1/10 382/103 |
| 2007/0282479 A1 | 12/2007 | Shibuya et al. | |
| 2008/0253737 A1 | 10/2008 | Kimura et al. | |

FOREIGN PATENT DOCUMENTS

| | | |
|---|---|---|
| JP | 2001-014016 A | 1/2001 |
| JP | 2007-323222 A | 12/2007 |

(Continued)

OTHER PUBLICATIONS

International Search Report dated Mar. 7, 2017 for corresponding PCT Application No. PCT/JP2016/088324.
(Continued)

*Primary Examiner* — Abolfazl Tabatabai
(74) *Attorney, Agent, or Firm* — Michael Best & Friedrich LLP

(57) ABSTRACT

A linkage between work for setting delimitation of motions and work for setting attribute information for the motions is improved. A work analysis device 10 includes a video image data acquisition unit 110 that acquires a video image obtained by imaging a series of motions performed by a worker, a delimitation operation reception unit 131 that receives a delimitation operation for setting a motion delimitation in the video image, a selection screen display control unit 122 that executes a process for displaying a selection screen for selecting attribute information to be associated with a video image range delimited by the delimitation operation at a timing when the delimitation operation is received by the delimitation operation reception unit 131, and a storage control unit 140 that stores the attribute (Continued)

information selected through the selection screen in association with the video image range.

10 Claims, 11 Drawing Sheets

(51) Int. Cl.
    *G05B 19/418*     (2006.01)
    *G06Q 10/06*     (2012.01)
    *G06K 9/00*     (2006.01)
    *G06Q 50/04*     (2012.01)

(52) U.S. Cl.
    CPC ... *G06K 9/00711* (2013.01); *G06Q 10/06398* (2013.01); *G06Q 10/063114* (2013.01); *G06Q 50/04* (2013.01); *Y02P 90/02* (2015.11); *Y02P 90/12* (2015.11); *Y02P 90/30* (2015.11)

(58) Field of Classification Search
    USPC .......................................................... 382/107
    See application file for complete search history.

(56) References Cited

FOREIGN PATENT DOCUMENTS

| | | |
|---|---|---|
| JP | 2011-034234 A | 2/2011 |
| JP | 2011-150569 A | 8/2011 |
| KR | 10-2013-0045092 A | 5/2013 |

OTHER PUBLICATIONS

Extended European Search Report (EESR) dated Jan. 29, 2019 for the corresponding European patent application No. EP16888199.3.
Luz Consulteam GMBH. "Handbuch Process TM 1-11 mobile." Jan. 1, 2013, pp. 11-13 and 24-31, www.process-suite.com/Download/ProcessSuite/PROCESS_TM mob_Handbuch.pdf. Cited in Non Patent Literature Documents No. 1 With partial machine English translation.
Korean Office Action dated Mar. 31, 2020 for the corresponding Korean Patent Application No. 10-2018-7024732, with machine English translation.

* cited by examiner

FIG. 3
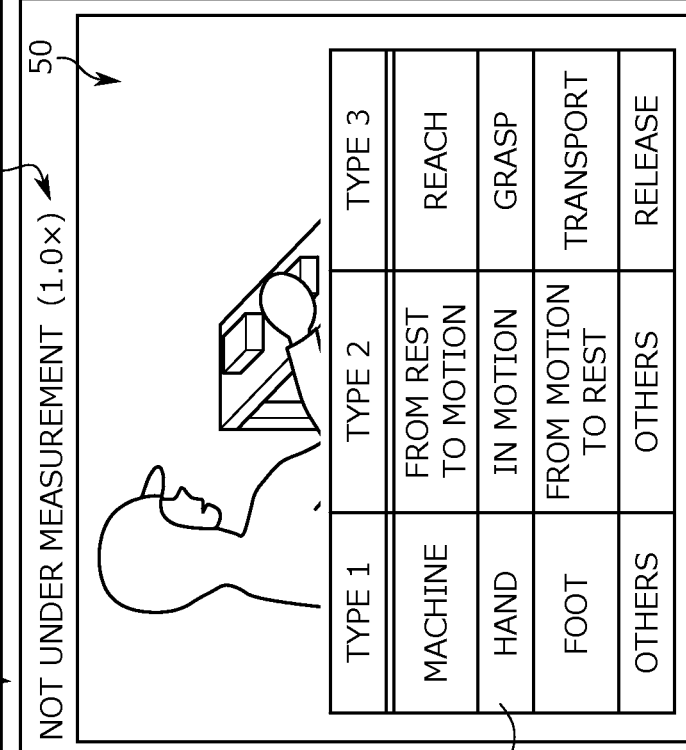
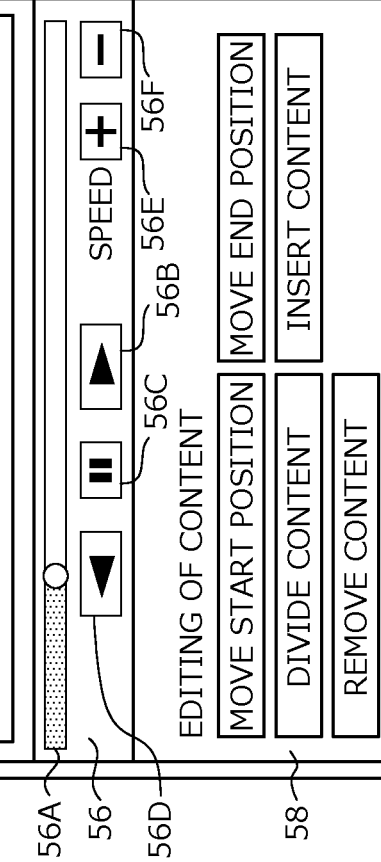

| MOTION ID | START PERIOD | TIME PERIOD | MOTION PERIOD | INVALID PERIOD | RATING | TYPE 1 | TYPE 2 | TYPE 3 |
|---|---|---|---|---|---|---|---|---|
| 1 | 0.00 | 5.00 | 4.00 | 1.00 | 100 | HAND | FROM REST TO MOTION | GRASP |
| 2 | 5.00 | 5.00 | 3.00 | 2.00 | 100 | HAND | IN MOTION | TRANSPORT |
| 3 | 10.00 | 5.00 | 4.00 | 1.00 | 100 | HAND | FROM MOTION TO REST | RELEASE |

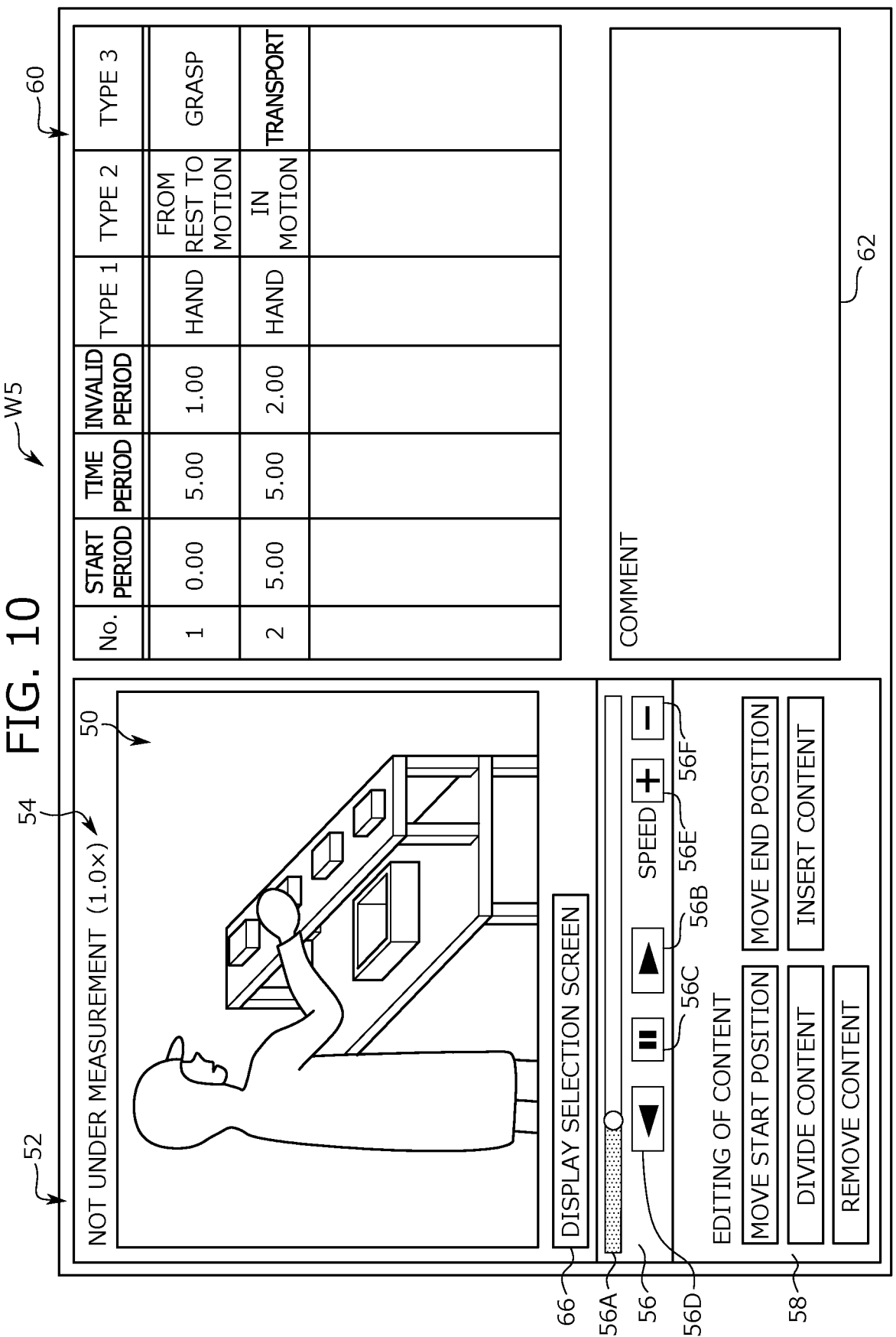

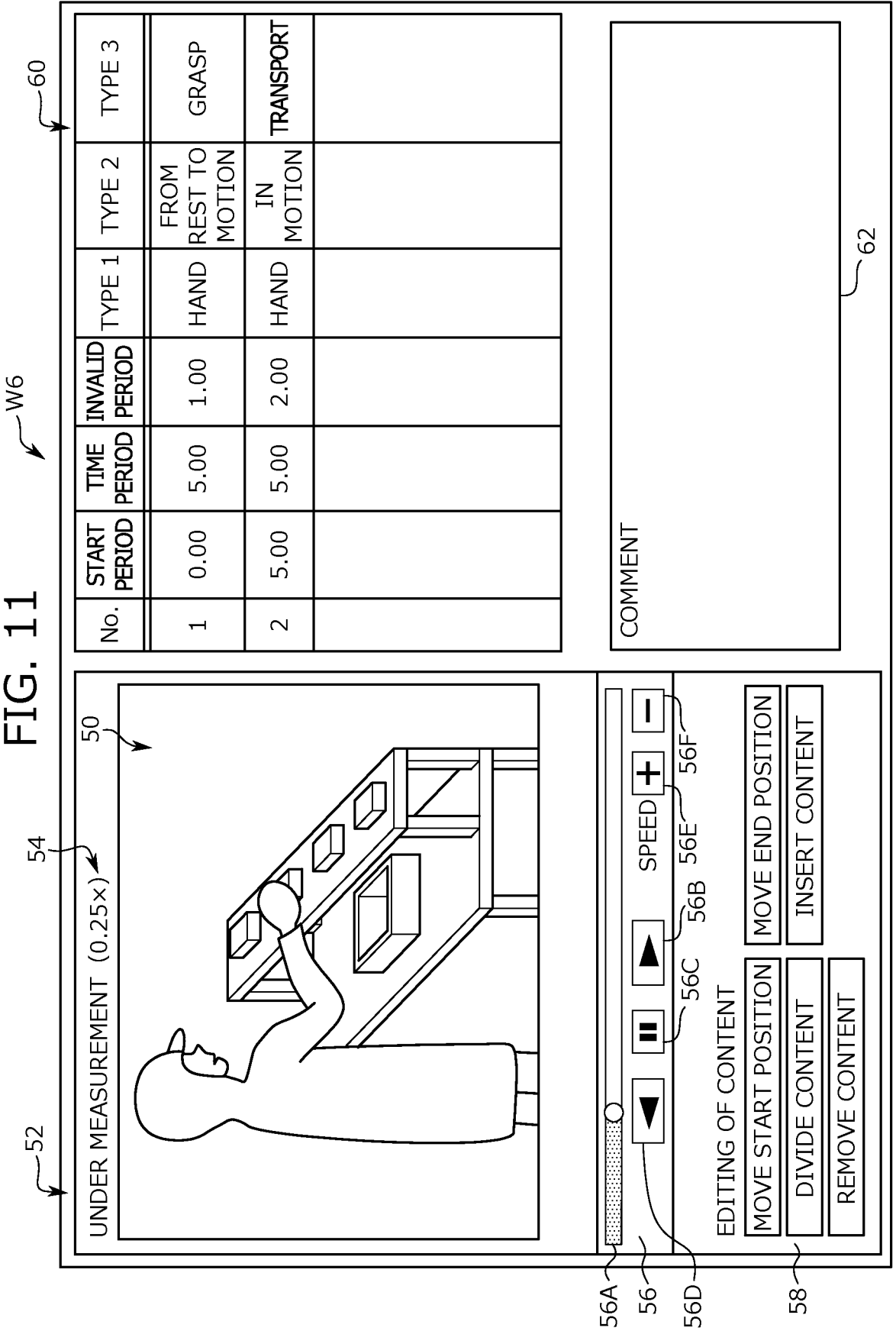

WORK ANALYSIS DEVICE, WORK ANALYSIS METHOD, PROGRAM AND INFORMATION STORAGE MEDIUM

CROSS-REFERENCE TO RELATED APPLICATIONS

This application is entering into the national phase of PCT Application Number PCT/JP2016/088324, filed on Dec. 22, 2016, which claims the benefit of priority from the Japanese Patent Application Number 2016-014526, filed on Jan. 28, 2016, the entire contents of which are incorporated herein by reference.

TECHNICAL FIELD

The present invention relates to a work analysis device, a work analysis method, a program, and an information storage medium for dividing a video image of work including a plurality of motions into portions corresponding to each motion and analyzing the divided video image.

BACKGROUND ART

In order to improve work efficiency, work may be imaged, and a video image (image) of the work may be analyzed. In the aforementioned work analysis, the video image of the work is delimited into ranges of a plurality of motions constituting the work, and a length of the video image of each motion (that is, the required time of each motion) is specified. Then, on the basis of the specified required time, it is determined whether or not improvement is necessary for each motion.

In the work analysis, attribute information such as classification, type, and the like is assigned to each motion constituting the work. In the invention disclosed in, for example, Patent Literature 1, the values of attribute information on the screen provided at the position far from a playback screen of the work video image are configured to be selected from pull-down lists.

CITATION LIST

Patent Literature

Patent Literature 1: JP 2011-150569 A

SUMMARY OF INVENTION

Technical Problem

However, as in the related art, when the linkage between work for finding a start time point or an end time point of each motion while watching a video image and work for selecting attribute information to be set for the motion delimited by a delimitation position is low, transition to the next work to be performed is not carried out smoothly, so that there is a concern that efficient execution of the work by the analyst is hindered. In particular, in the case of analyzing a video image obtained by imaging work repeatedly performed a plurality of times, the start time point or the end time point of each motion are found for each work, and thus, load on the analyst is further increased.

Therefore, in view of the above problems, an object of the present invention is to provide a work analysis device, a work analysis method, a program, and an information storage medium capable of improving a linkage between work for setting a delimitation of a motion and work for setting attribute information in the motion to improve work efficiency.

Solution to Problem

The above problems are solved by a work analysis device according to the present invention, which includes: an acquisition unit that acquires a video image obtained by imaging a series of motions performed by a worker; a reception unit that receives a delimitation operation for setting a motion delimitation in the video image; a display control unit that executes a process for displaying a selection screen for selecting attribute information to be associated with a video image range delimited by the delimitation operation at a timing when the delimitation operation is received by the reception unit; and a storage control unit that stores the attribute information selected through the selection screen in association with the video image range.

In addition, the above problems are solved by a work analysis method according to the present invention, which includes the steps of: the computer acquiring a video image obtained by imaging a series of motions performed by a worker; the computer receiving a delimitation operation for setting a motion delimitation in the video image; the computer executing a process for displaying a selection screen for selecting attribute information to be associated with a video image range delimited by the delimitation operation at a timing when the delimitation operation is received; and the computer storing the attribute information selected through the selection screen in association with the video image range.

Furthermore, the above problems are solved by a program according to the present invention, which causes a computer to function as: an acquisition unit that acquires a video image obtained by imaging a series of motions performed by a worker; a reception unit that receives a delimitation operation for setting a motion delimitation in the video image; a display control unit that executes a process for displaying a selection screen for selecting attribute information to be associated with a video image range delimited by the delimitation operation at a timing when the delimitation operation is received by the reception unit; and a storage control unit that stores the attribute information selected through the selection screen in association with the video image range.

Additionally, the above problems are solved by a computer-readable information storage medium according to the present invention, which stores a program for causing a computer to function as: an acquisition unit that acquires a video image obtained by imaging a series of motions performed by a worker; a reception unit that receives a delimitation operation for setting a motion delimitation in the video image; a display control unit that executes a process for displaying a selection screen for selecting attribute information to be associated with a video image range delimited by the delimitation operation at a timing when the delimitation operation is received by the reception unit; and a storage control unit that stores the attribute information selected through the selection screen in association with the video image range.

According to the work analysis device, the work analysis method, the program, and the information storage medium described above, following the delimitation operation for setting the motion delimitation for the video image obtained by imaging a series of motions performed by the worker, it is possible to display the selection screen for selecting the attribute information to be associated with the video image range delimited by the delimitation operation. Therefore, since it is possible to improve the linkage between the setting of the video image range corresponding to the motion and the selection of the attribute information for the set video image range, the work efficiency is improved.

In addition, according to one aspect of the present invention, the above-described work analysis device further includes a video image playback unit that plays back and displays the video image on a playback screen, in which the selection screen is displayed to be superimposed on at least a portion of the playback screen.

Accordingly, it is possible to reduce an amount of movement of the line of sight from the playback screen of the video image to the selection screen of the attribute information. Therefore, it is possible to reduce the load of the analyst in the flow starting from the delimitation operation to the selection operation of the attribute information, so that it is possible to improve the work efficiency.

In one aspect of the present invention, in the above-described work analysis device, a list of options for each of a plurality of pieces of the attribute information is displayed on the selection screen, the work analysis device further includes a selection operation reception unit for receiving selection of an option from the list of options for each of the plurality of pieces of the attribute information displayed on the selection screen, and the storage control unit stores the option received by the selection operation reception unit in association with the video image range.

Accordingly, it is possible to collectively select a plurality of pieces of the attribute information to be set for the video image range delimited by the delimitation operation. Therefore, it is possible to reduce the number of times of operations by the analyst, so that it is possible to improve the work efficiency.

In one aspect of the present invention, in the above-described work analysis device, in a case where an indication operation of indicating at least a portion of an area of the playback screen other than the selection screen is received, the storage control unit stores the option received by the selection operation reception unit in association with the video image range.

Accordingly, it is possible to realize the operation of accepting the option by a simple operation.

In addition, according to one aspect of the present invention, in the above-described work analysis device, the video image playback unit stops the playback and display of the video image in a case where the delimitation operation is received and resumes the playback and display of the video image in a case where the indication operation of indicating at least a portion of an area of the playback screen other than the selection screen is received.

Accordingly, it is possible to start the analysis work for the next motion delimitation following the option determination operation. As a result, since the number of operations by the analyst can be reduced, it is possible to improve the work efficiency of the analysis work.

In one aspect of the present invention, in the above-described work analysis device, the delimitation operation is an indication operation of indicating at least a portion of the playback screen while the video image is played back and displayed on the playback screen.

Accordingly, it is possible to allow the analyst to perform a delimitation operation while gazing at the playback display of the video image. As a result, since the analyst can perform the delimitation operation without removing the line of sight from the playback display of the video image, it is possible to determine the delimitation position with high accuracy.

In one aspect of the present invention, in the above-described work analysis device, after the attribute information selected on the basis of the selection screen is stored in association with the video image range, the display control unit sets the selection screen to be hidden.

Accordingly, the selection screen can be set to be hidden while the selection screen is not necessary. As a result, since the size of the screen other than the selection screen such as the playback screen can be increased, it is possible to improve the work efficiency of the analyst.

In addition, according to one aspect of the present invention, in the above-described work analysis device, the video image playback unit can play back the video image at a variable speed, and the display control unit executes the process for displaying the selection screen at a timing when the predetermined operation is received while the video image is played back at a speed lower than a normal speed.

Accordingly, in a case where there is a high possibility that the analyst finds a delimitation position, it is possible to control so that the selection screen is displayed.

Advantageous Effects of Invention

According to the present invention, since it is possible to improve the linkage between the setting of the video image range corresponding to the motion and the selection of the attribute information for the set video image range, it is possible to improve the work efficiency.

BRIEF DESCRIPTION OF DRAWINGS

FIG. 3 is a diagram illustrating an example of a work analysis screen.

FIG. 10 is a diagram illustrating an example of a work analysis screen.

FIG. 11 is a diagram illustrating an example of a work analysis screen.

DESCRIPTION OF EMBODIMENTS

Hereinafter, a work analysis device (hereinafter, a work analysis device 10) according to one embodiment (this embodiment) of the present invention will be described. In addition, the embodiment described below is an example for facilitating understanding of the present invention and does not limit the present invention. That is, the present invention can be changed and modified without departing from the spirit thereof, and equivalents thereof are included in the present invention.

The work analysis device 10 is suitable for a tool for work analysis for analyzing a video image obtained by imaging a series of motions of a worker. Specifically, the work analysis device 10 is a computer suitable for evaluating work efficiency and the like by calculating a required time (work time) of the work. Herein, "work" includes a plurality of motions, specifically, a set of a series of motions performed by a worker under a set plan or purpose. A "motion" corresponds to an element constituting the work and is, for example, a minimum unit when the work is finely divided. Hereinafter, a user who operates the work analysis device 10 to execute work analysis is referred to as an analyst.

1. Hardware Configuration of Work Analysis Device 10

Figure 1:
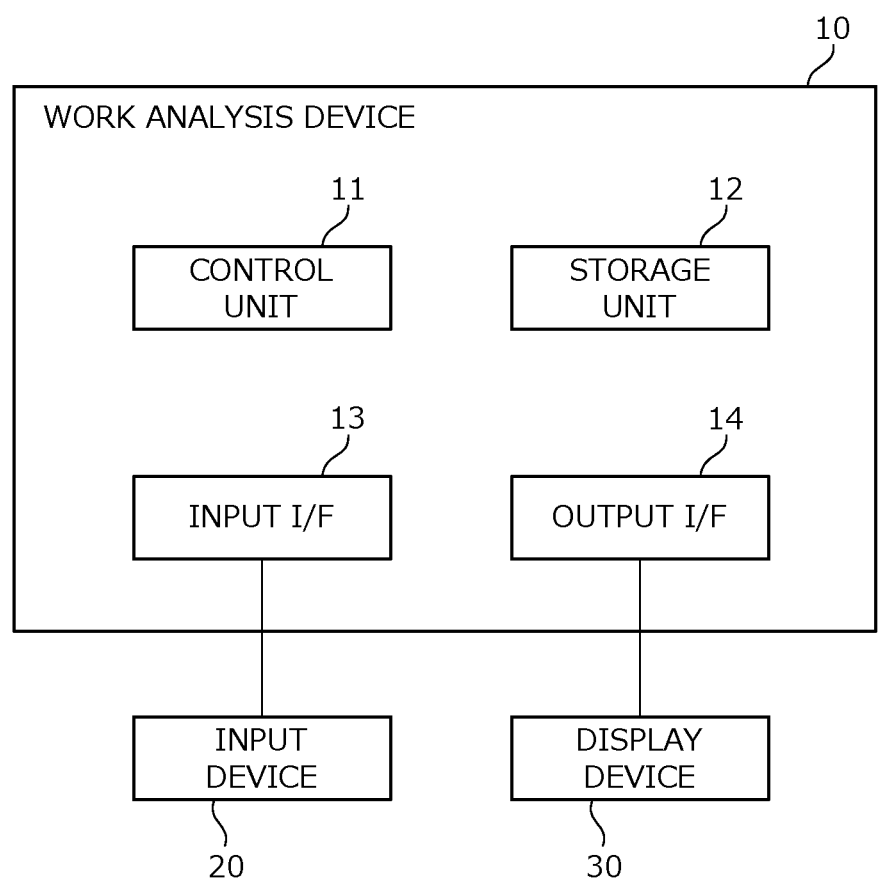
FIG. 1 is a configuration diagram illustrating hardware of a work analysis device.

First, the hardware configuration of the work analysis device 10 according to this embodiment will be described. FIG. 1 is a diagram illustrating hardware configuration of the work analysis device 10 according to this embodiment. As illustrated in FIG. 1, the work analysis device 10 is a computer including a control unit 11, a storage unit 12, an input interface 13, and an output interface 14.

The control unit 11 is configured to include, for example, a central processing unit and to execute various calculation processes on the basis of programs and data which are stored in the storage unit 12 and control each unit of the work analysis device 10.

The storage unit 12 is configured to include, for example, a memory and a magnetic disk device and to not only store various programs and data and but also function as a working memory of the control unit 11. In addition, the storage unit 12 may include an information storage medium such as a flash memory, and an optical disk and a reading device which reads information from the information storage medium.

The input interface 13 receives information input from a device connected to the work analysis device 10. For example, the input interface 13 is connected with an input device 20 such as a keyboard or a mouse and receives operation information input by an analyst from the input device 20.

The output interface 14 outputs information to a device connected to the work analysis device 10. The output interface 14 is configured to include, for example, a graphic card and is connected to a display device 30 such as a liquid crystal display device. Then, the output interface 14 outputs graphic data generated by the control unit 11 to the display device 30 and allows the display device 30 to display a screen based on the graphic data.

In addition, the hardware configuration of the work analysis device 10 is merely an example and is not limited to the hardware configuration described above. For example, in the above-described example, in the work analysis device 10, although the input device 20 and the display device 30 are externally connected to the work analysis device 10, the input device 20 and the display device 30 may be built in the work analysis device 10. In addition, the work analysis device 10 may include a communication unit to be capable of communicating with an external device.

2. Overview of Processes of Work Analysis Device 10

Next, the overview of processes executed by the work analysis device 10 according to this embodiment will be described with reference to FIGS. 2 to 5.

FIGS. 2 to 5 are examples of screens (work analysis screens) displayed on the display device 30 connected to the work analysis device 10 according to the processes of the work analysis device 10. First, display contents of the work analysis screen will be described with reference to FIG. 2.

Figure 2:
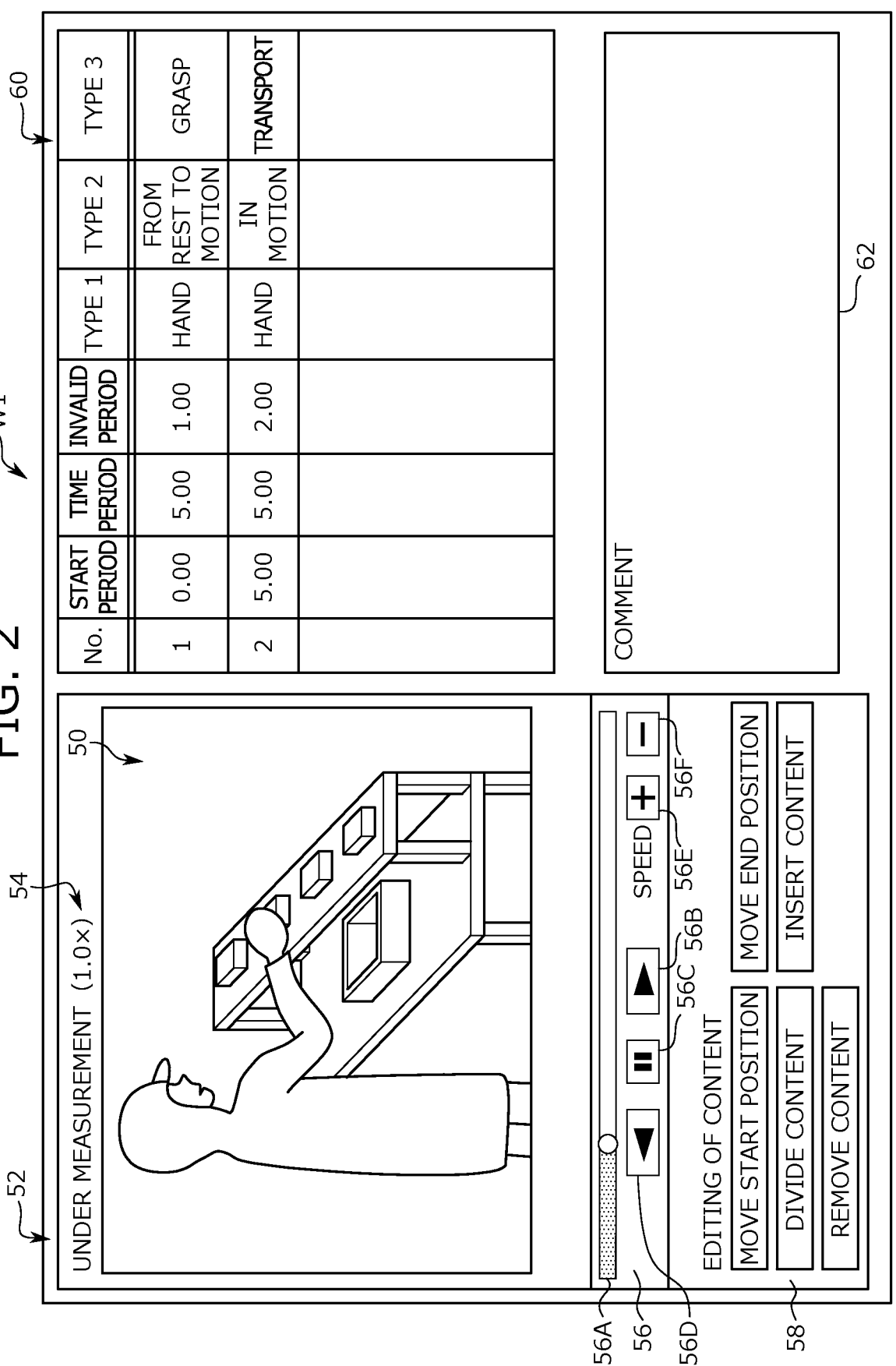
FIG. 2 is a diagram illustrating an example of a work analysis screen.

As illustrated in FIG. 2, a playback screen 50, a measurement state display area 52, a playback speed display area 54, a playback operation area 56, a content edit operation area 58, an element motion information display area 60, and a comment entry area 62 are displayed on a work analysis screen W1.

The playback screen 50 is a screen area for playing back and displaying a video image obtained by imaging a series of motions of a worker.

The measurement state display area 52 is a display area for displaying whether the work is "under measurement" or "not under measurement". Herein, the "not under measurement" represents that the work time of the work (motion) being played back on the playback screen 50 is being measured. On the other hand, the "not under measurement" represents that the measurement of the work time is not performed, for example, due to the playback display of the video image being at rest on the playback screen 50.

The playback speed display area 54 is an area for displaying a playback speed of the video image played back on the playback screen 50. For example, "1.0×" in the playback speed display area 54 represents that the video image is being played back at a normal speed (that is, the same speed as that during recording and 1× speed) on the playback screen 50. In addition, for example, "0.5×" in the playback speed display area 54 represents that the video image is being played back at half the normal speed on the playback screen 50, and "2.0×" in the playback speed display area 54 represents that the video image is being played back at double the normal speed on the playback screen 50.

The playback operation area 56 is an area for receiving an operation for controlling the playback display of the video image on the playback screen 50. The playback operation area 56 includes a variable playback position scroll bar 56A, a forward playback button 56B, a pause button 56C, a backward playback button 56D, a speed increase button 56E, and a speed decrease button 56F.

The variable playback position scroll bar 56A is an operation portion for displaying a playback position of the video image to be played back on the playback screen 50 and for moving the playback position. In addition, the position of the knob of the variable playback position scroll bar 56A corresponds to the playback position in the video image, and thus, the playback position can be varied by moving the position of the knob.

The forward playback button 56B is an operation portion for playing back the video image in the forward direction on the playback screen 50. The pause button 56C is an operation portion for temporarily stopping the playback of the video image on the playback screen 50. The backward playback button 56D is an operation portion for playing back (rewinding) the video image in the backward direction on the playback screen 50.

The speed increase button 56E is an operation portion for increasing the playback speed of the video image on the playback screen 50, and the speed decrease button 56F is an operation portion for decreasing the playback speed of the video image on the playback screen 50. In addition, the playback speed may be varied in a predetermined range (for example, a range from 0.1 times to 10.0 times the normal speed) by a predetermined unit (for example, by 0.1 times). In this case, every time the speed increase button 56E is pressed, the speed is increased from the current playback speed by the predetermined unit, and every time the speed decrease button 56F is pressed, the speed is decreased from the current playback speed by the predetermined unit.

The content edit operation area 58 is an operation portion for selecting various editing commands for a target video image range. For example, the content edit operation area 58 includes buttons associated with various operations such as a change operation of a start position and an end position of the target video image range, a division operation of the target video image range, and a deletion operation.

The element motion information display area 60 is an area for displaying information on the video image range corresponding to each motion (element motion) extracted from the work. In addition, the element motion corresponds to the video image range from the start of measurement to the stop of measurement for the video image played back on the playback screen 50. In addition, in a case where the start position or the stop position of the measurement is changed, the video image range of the element motion is defined on the basis of the changed start position or the changed stop position of the measurement.

In the example illustrated in FIG. 2, in the element motion information display area 60, displayed is information of a beginning of period, a duration period, an invalid period, and types 1 to 3 for each element motion in association with each other. Herein, the beginning of period is information indicating from which position (time) in the video image the beginning of the period of element motion starts. The duration period is information indicating how long the element motion continues from the aforementioned beginning of the period. The invalid period is information indicating how many invalid operations exist during the aforementioned duration periods. In addition, the types 1 to 3 are a plurality of types of attribute information associated with each element motion.

In this embodiment, the type 1 is information indicating a portion where the work is being executed, and options of the type 1 are "Machine", "Hand", "Foot", and "Others". In addition, the type 2 is information indicating the state of a motion of the worker, and options of the type 2 are "From rest to motion", "In motion", "From motion to rest", and "others". In addition, the type 3 is information indicating the classification (Therblig) of the motion, and options of the type 3 are "Transport Empty", "Grasp", "Transport Loaded", or "Release Load". In addition, the aforementioned types and options are only examples, and the types and options are not limited thereto.

The comment entry area 62 is an area for entering comments, and comments entered in the comment entry area 62 may be stored in association with the element motions.

Hereinafter, the overview of the process in the work analysis device 10 will be described with reference to screen examples of FIGS. 2 to 5.

[2.1. Measurement]

First, the work analysis device 10 executes measurement when receiving an operation of starting a measurement. A work analysis screen W1 illustrated in FIG. 2 corresponds to a screen in a case where a motion of the worker is under measurement.

[2.2. Stop of Measurement and Display of Selection Screen]

Next, when the measurement is stopped by executing an indication operation of indicating a portion of the playback screen 50, a work analysis screen W2 illustrated in FIG. 3 is displayed on the display device 30. In addition, in this embodiment, it is assumed that a mouse is used as the input device 20, and an operation of clicking a portion of the playback screen 50 under measurement is defined as a delimitation operation for setting a delimitation of the motion. In addition, the aforementioned indication operation is an operation of pressing a point or an area on the screen such as a click operation of a mouse, a touch operation of a touch panel, or the like physically or on the screen. In addition, in the following description, it is assumed that any of the indication operations described above is performed by the click operation.

As illustrated in FIG. 3, on the work analysis screen W2, since the measurement is stopped, the "not under measurement" is displayed in the measurement state display area 52. In addition, on the work analysis screen W2, a selection screen 64 is displayed on a portion of the playback screen 50.

The selection screen 64 is a screen for selecting attribute information to be associated with the video image range delimited by a delimitation operation. In this embodiment, on the selection screen 64, a list of options for each of types 1 to 3 are displayed, and information selected by the analyst among the displayed list of the options is associated with the target video image range.

[2.3. Selection of Attribute Information]

Figure 4:
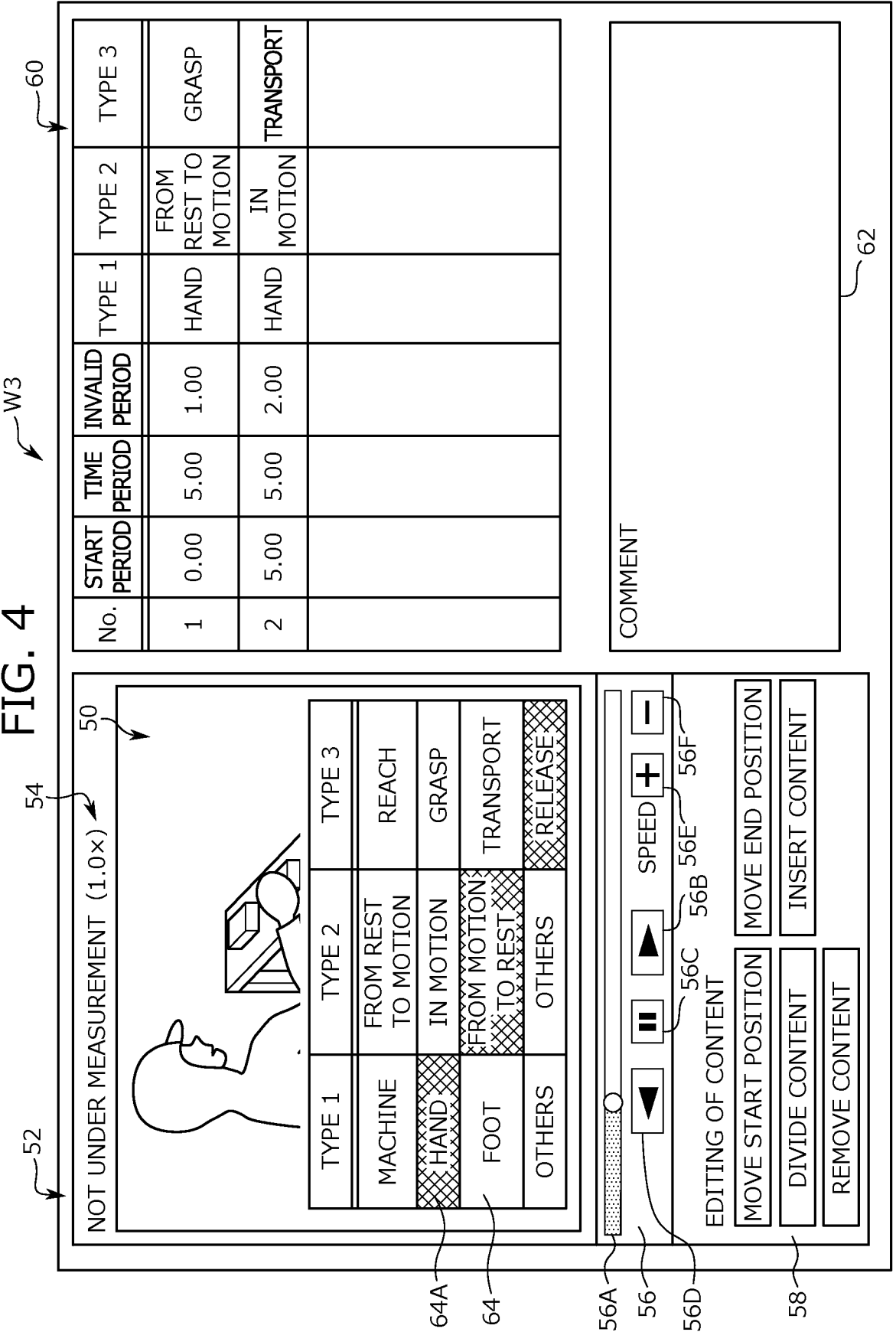
FIG. 4 is a diagram illustrating an example of a work analysis screen.

FIG. 4 illustrates an example of a work analysis screen W3 in the state where options are selected by an operation on the selection screen 64. On the selection screen 64 illustrated in FIG. 4, a selection content display mark 64A is added to the option selected for each type. The selection content display mark 64A may be shaded, for example. Besides, the selection content display mark 64A may be displayed in a predetermined color or the like and is not particularly limited so long as the selection content display mark can be distinguished from an option that has not selected. In addition, the selection of the option may be executed by the click operation on the display area of the option. In this embodiment, it is assumed that one option can be selected for one type. For example, in a case where the display area of "Foot" is clicked in the state where "Hand" has been selected for the type 1, the state where "Hand" has been selected is canceled, and the state is transitioned to the state where the "Foot" has been selected.

[2.4. Resumption of Measurement]

Figure 5:
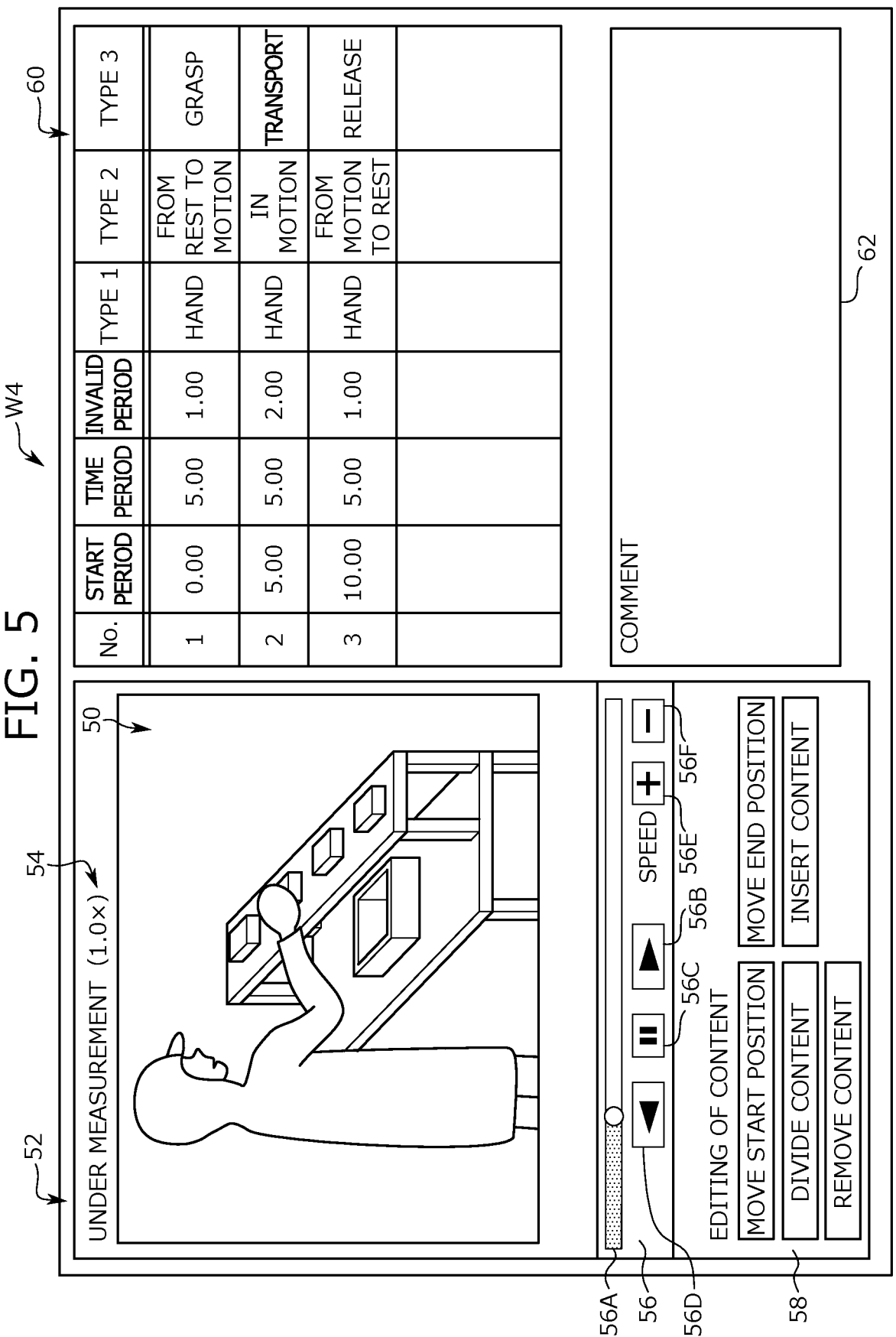
FIG. 5 is a diagram illustrating an example of a work analysis screen.

After the option for each type on the selection screen 64 is selected, when an area of the playback screen 50 that is not superimposed on the selection screen 64 is clicked, the measurement is resumed, and a work analysis screen W4 illustrated in FIG. 5 is displayed on the display device 30.

As illustrated in FIG. 5, on the work analysis screen W4, the display of the measurement state display area 52 is changed under measurement, and the selection screen 64 displayed on the playback screen 50 is hidden.

In addition, to the element motion information display area 60, a record storing the information on the video image range delimited by the preceding delimitation operation is added. In this added record, the information of the options selected for the types 1 to 3 on the selection screen 64 is stored.

According to the process described above, following the delimitation operation of the motion, the analyst can execute the operation for selecting the attribute information to be associated with the video image range delimited by the delimitation operation. Therefore, it is possible to improve the work efficiency. In addition, it is possible to collectively select a plurality of pieces of the attribute information unlike the case of selecting each of the attribute information (type) one by one and, after that, selecting the values to be associated with each other, so that it is possible to reduce the number of operations and the labor of operations. Furthermore, since the delimitation operation and the selection operation of the motion can be executed in the same screen region, an amount of movement of the line of sight can be reduced, so that it is possible to improve the operation efficiency. Hereinafter, functions provided in the work analysis device 10 to realize the above-described processes will be described.

3. Functional Configuration of Work Analysis Device

Figure 6:
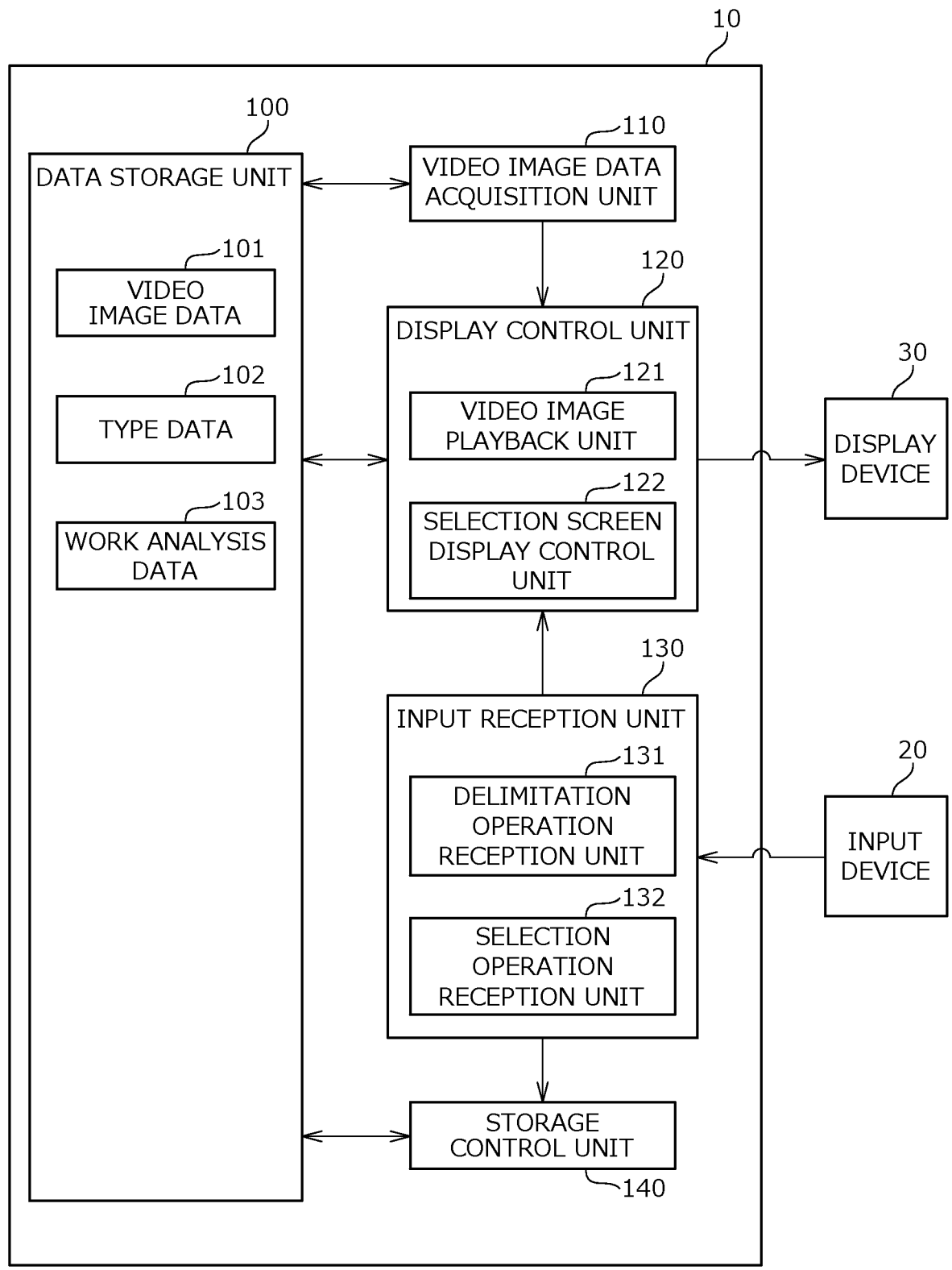
FIG. 6 is a functional block diagram of a work analysis device.

As illustrated in FIG. 6, the work analysis device 10 includes a data storage unit 100, a video image data acquisition unit 110, a display control unit 120, an input reception unit 130, and a storage control unit 140 as functions.

The functions of the above-described units provided in the work analysis device 10 are realized by the control unit 11 of the work analysis device 10 controlling each component of the work analysis device 10 to operate on the basis of a program stored in the storage unit 12. In addition, the work analysis device 10 may read the program from an information storage medium or may download the program through a network such as the Internet or an intranet by a communication unit (not illustrated). Hereinafter, the functions of the above-described components provided in the work analysis device 10 will be described in detail.

[3.1. Data Storage Unit 100]

The data storage unit 100 is realized mainly by the storage unit 12 of the work analysis device 10. The data storage unit 100 stores various types of data relating to work analysis. Specifically, in this embodiment, video image data 101, type data 102, and work analysis data 103 are stored in the data storage unit 100.

The video image data 101 is data of a work video image to be analyzed. The work video image is obtained by imaging a series of motions of the worker. The video image data 101 may be stored in the data storage unit 100 by copying and moving from the information storage medium storing the data imaged by a camera to the data storage unit 100.

[3.1.1. Type Data 102]

The type data 102 is data that defines a plurality of types associated with the video image range in which the work video image is delimited for each motion and information on the options that serve as the values for each type.

Figure 7:
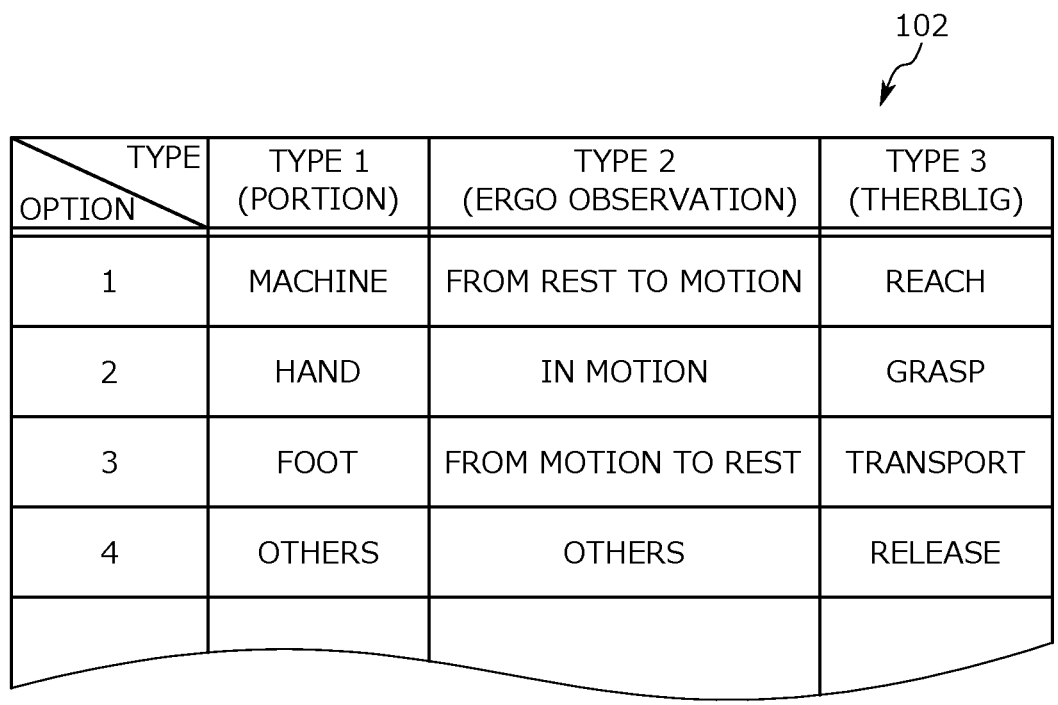
FIG. 7 is a diagram illustrating an example of type data.

FIG. 7 illustrates an example of the type data 102. In the example illustrated in FIG. 7, the type data 102 is a data table in which information of options that can be acquired for each of the types 1 to 3 is stored in association with each other.

As illustrated in FIG. 7, the type 1 is information indicating the portion where the work is being executed, and options of type 1 are "Machine", "Hand", "Foot", and "Others". In addition, the type 2 is information indicating the state of a motion of the worker, and options of type 2 are "From rest to motion", "In motion", "From motion to rest", and "Others". The type 3 is information indicating the classification (Therblig) of the motion, and options of the type 3 are "Transport Empty", "Grasp", "Transport Loaded", "Release Load", and the like.

[3.1.2. Work Analysis Data 103]

The work analysis data 103 is data indicating the analysis result of a work video image to be analyzed. For example, the work analysis data 103 stores information of analysis information obtained by analyzing motions obtained by delimiting a work including a series of motions according to the delimitation operation by an analyst.

Figure 8:
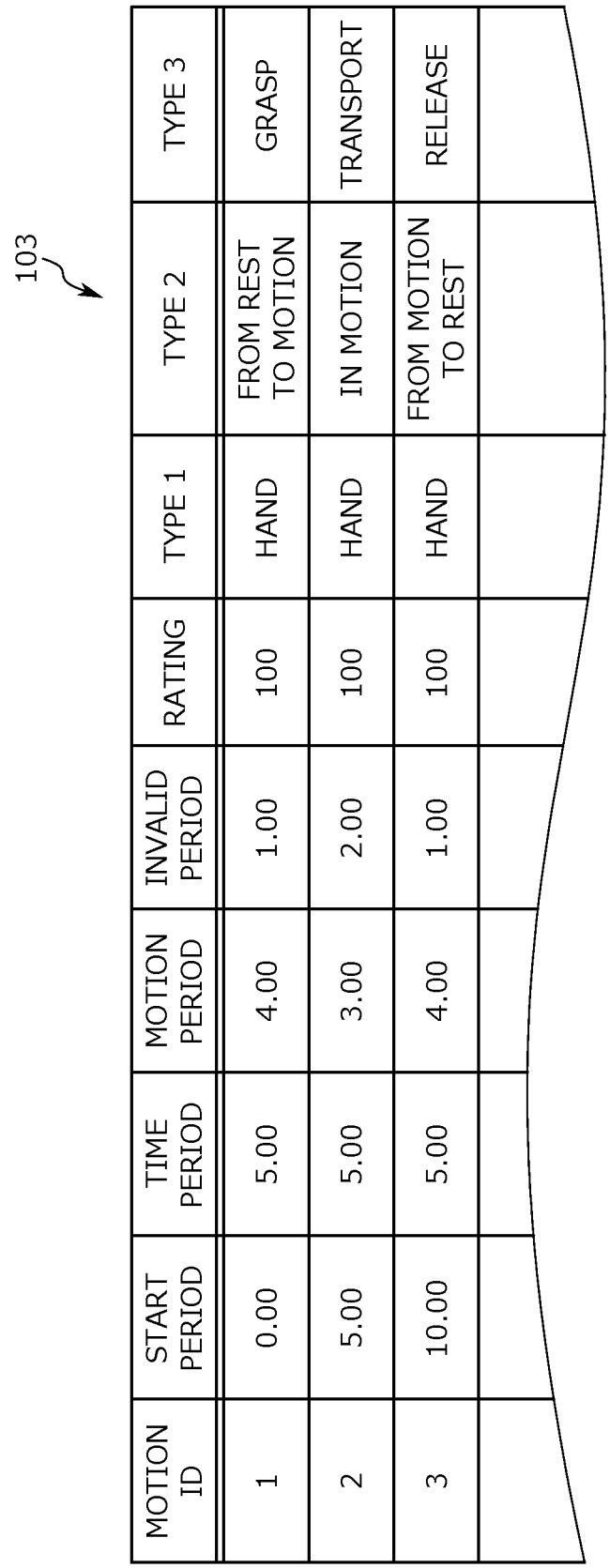
FIG. 8 is a diagram illustrating an example of work analysis data.

FIG. 8 illustrates an example of the work analysis data 103. In the example illustrated in FIG. 8, the work analysis data 103 is table data in which a motion ID for identifying each motion extracted from the work, a beginning of period and a time period (a length of time delimited as a motion) of the motion, a motion period (valid period measured as a motion during the aforementioned time period), an invalid period (invalid period not measured as a motion during the aforementioned period), a rating (correction coefficient of a work time), information of each type of the type 1, the type 2, and the type 3 are stored in association with each other. In addition, the data stored in the work analysis data 103 may be set on the basis of the information received from the analyst through the work analysis screen. Specifically, the information on the start period and the time period is set on the basis of the information received by a delimitation operation reception unit 131 described later, and the information on the types 1 to 3 is set on the basis of the information received by a selection operation reception unit 132 described later.

[3.2. Video Image Data Acquisition Unit 110]

The video image data acquisition unit 110 is realized mainly by the control unit 11, the storage unit 12, and the input interface 13 of the work analysis device 10. The video image data acquisition unit 110 acquires the video image data 101 to be analyzed from the data storage unit 100. In addition, the video image data 101 to be analyzed may be specified on the basis of the data input through the input interface 13. In addition, in a case where the video image data 101 is stored in a database different from the work analysis device 10, the video image data acquisition unit 110 may acquire the video image data 101 from the database.

[3.3. Display Control Unit 120]

The display control unit 120 is realized mainly by the control unit 11, the storage unit 12, and the output interface 14 of the work analysis device 10. For example, the display control unit 120 generates graphic data of the work analysis screen, outputs the generated graphic data to the display device 30, and controls the display device 30 to display the work analysis screen based on the graphic data. Specifically, the display control unit 120 includes a video image playback unit 121 and a selection screen display control unit 122 and executes display control of the above-described work analysis screen.

[3.3.1. Video Image Playback Unit 121]

The video image playback unit 121 plays back and displays the video image data 101 on the playback screen 50 of the work analysis screen on the basis of the video image data 101 stored in the data storage unit 100. For example, the video image playback unit 121 controls the playback position, the playback direction and speed, the playback start and stop, and the like of the video image data 101 on the basis of the operation information input through the playback operation area 56.

[3.3.2. Selection Screen Display Control Unit 122]

The selection screen display control unit 122 executes control for displaying the selection screen 64 on the work analysis screen. For example, the selection screen display control unit 122 may control the selection screen 64 on the work analysis screen to be displayed so as to be superimposed on a portion of the playback screen 50 at the timing when the delimitation operation is received by the delimitation operation reception unit 131. As illustrated in FIG. 3, on the selection screen 64, a list of candidates (options) of the values of the attribute information (for example, the types 1 to 3) to be associated with the video image range delimited by the delimitation operation are displayed.

In addition, in a case where the options for each type to be associated with the video image range are selected by the selection operation reception unit 132 described later, the selection screen display control unit 122 may control the selected option to be displayed in such a manner that the selected option can be distinguished from unselected options as illustrated in FIG. 4.

In addition, in a case where the selection of attribute information through the selection screen 64 is completed, for example in a case where the click operation (indication operation) is performed on an area other than the selection screen 64 on the playback screen 50, the selection screen display control unit 122 may control the selection screen 64 to be switched to be hidden.

[3.4. Input Reception Unit 130]

The input reception unit 130 is realized mainly by the control unit 11, the storage unit 12, the input interface 13, and the output interface 14 of the work analysis device 10. The input reception unit 130 receives various inputs from the input device 20 through the input interface 13 in the state where the work analysis screen is displayed on the display device 30 through the output interface 14. Specifically, the input reception unit 130 includes the delimitation operation reception unit 131 and the selection operation reception unit 132.

[3.4.1. Delimitation Operation Reception Unit 131]

The delimitation operation reception unit 131 receives the delimitation operation for setting a motion delimitation for a work video image. Specifically, when the delimitation operation reception unit 131 receives an instruction to start measurement and receives the click operation (indication operation) on the playback screen 50 while a video image based on the video image data 101 is played back on the playback screen 50, the click operation may be treated as the delimitation operation. In addition, the delimitation operation is not limited to the aforementioned click operation and other operations such as measurement stop operation may be treated as the delimitation operation.

[3.4.2. Selection Operation Reception Unit 132]

The selection operation reception unit 132 receives the selection operation of the attribute information input through the selection screen 64 displayed by the selection screen display control unit 122. Specifically, the selection operation reception unit 132 receives the information of the option selected by the analyst from the options for each of the types displayed on the selection screen 64. When the selection operation reception unit 132 receive the click operation of the area other than the selection screen 64 in a selected state where the option clicked on the selection screen 64 has been selected, the above-described selected state may be accepted.

[3.5. Storage Control Unit 140]

The storage control unit 140 is realized mainly by the control unit 11 and the storage unit 12 of the work analysis device 10. The storage control unit 140 updates the storage contents of the data storage unit 100 on the basis of the input received by the input reception unit 130.

For example, in a case where the selection operation of the attribute information is received by the selection operation reception unit 132, the storage control unit 140 stores the attribute information selected by the selection operation in association with the video image range delimited by the delimitation operation received by the delimitation operation reception unit 131. Specifically, in a case where the selection operation is received by the selection operation reception unit 132, the storage control unit 140 stores options for each type selected on the selection screen 64 in association with the video image range delimited by the delimitation operation received by the delimitation operation reception unit 131 in the work analysis data 103.

4. Flow of Work Analysis Process

The above is the description of the functions provided in the work analysis device 10. Next, the flow of the work analysis process executed by the work analysis device 10 will be described with reference to a flowchart illustrated in FIG. 9.

Figure 9:
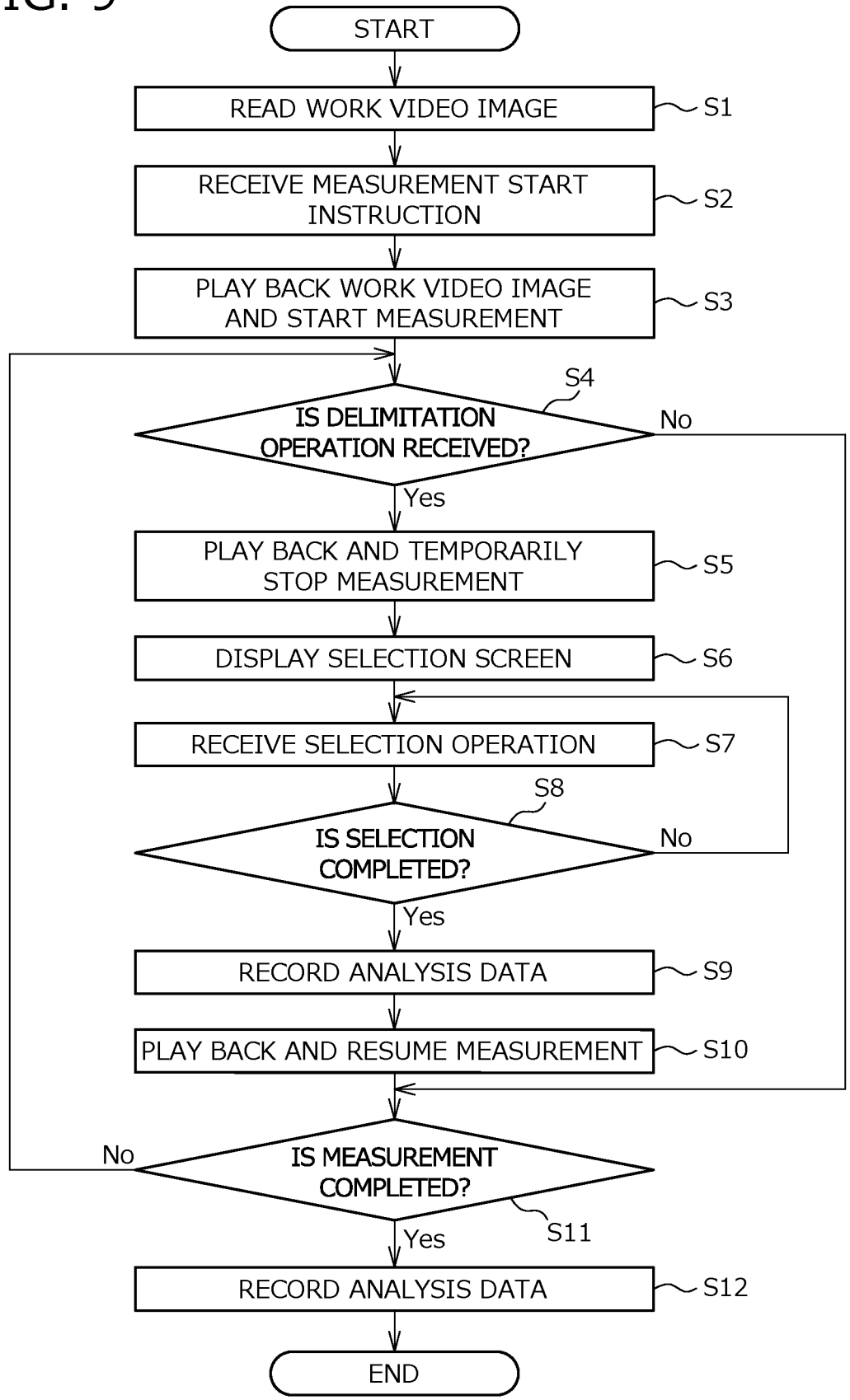
FIG. 9 is a flowchart of a work analysis process executed by a work analysis device.

As illustrated in FIG. 9 the control unit 11 of the work analysis device 10 reads the data of the work video image (video image data 101) to be analyzed from the data storage unit 100 according to an operation (for example, an operation for specifying the work video image to be analyzed) received through the input interface 13 (S1).

Next, when the measurement start operation is received through the input interface 13 (S2), the control unit 11 of the work analysis device 10 starts the playback and measurement (measurement of work time) of the work video image on the basis of the video image data 101 read in S1 (S3). In addition, the work analysis screen W1 illustrated in FIG. 2 corresponds to an example of the screen displayed on the display device 30 in S3. In this case, the work video image is played back and displayed on the playback screen 50.

Then, when the delimitation operation is received through the input interface 13 (S4: Y), the control unit 11 of the work analysis device 10 temporarily stops the playback and measurement of the work video image (S5) and controls the display device 30 to display the selection screen for selecting the attribute information to be associated with the video image range delimited by the delimitation operation (S6). In addition, the work analysis screen W2 illustrated in FIG. 3 corresponds to an example of the screen displayed on the display device 30 in S6. In this case, the selection screen 64 included in the work analysis screen W2 corresponds to an example of the selection screen displayed at S6.

Next, the control unit 11 of the work analysis device 10 receives the selection operation through the input interface 13 (S7). The selection operation in S7 is an operation for receiving an option selected by the analyst from the options for each type displayed on the selection screen 64. Specifically, the process of S7 is realized by the selection operation reception unit 132. The work analysis screen W3 illustrated in FIG. 4 corresponds to an example of the screen displayed on the display device 30 in S7.

The control unit 11 of the work analysis device 10 determines whether or not the selection of the attribute information has been completed (S8). In a case where the selection has not been completed (S8: N), the process returns to S7. In a case where the selection has been completed (S8: Y), the process proceeds to S9. Whether or not the selection of the attribute information of S8 has been completed may be determined depending on whether or not an operation for accepting the selection has been received through the input interface 13. For example, the above-described acceptance operation may be the click operation on an area other than the selection screen 64 on the playback screen 50 as illustrated in FIG. 4.

In a case where the selection in S8 has been completed (S8: Y), the control unit 11 of the work analysis device 10 records the analysis data including the attribute information selected by the selection operation in association with the video image range delimited by the delimitation operation (S9). For example, the control unit 11 of the work analysis device 10 may add a record of a video image range newly delimited by the delimitation operation to the work analysis data 103 of the data storage unit 100 and may record the aforementioned analysis data in the added record.

Then, the control unit 11 of the work analysis device 10 resumes the playback and measurement (measurement of work time) of the work video image based on the video image data 101 (S10). In addition, the work analysis screen W4 illustrated in FIG. 5 corresponds to an example of the screen displayed on the display device 30 in S10. As illustrated in FIG. 5, to the element motion information display area 60, added is the information of the analysis data including the video image range delimited by the preceding delimitation operation and the attribute information associated with the video image range in S9.

In a case where the measurement is not ended (S11: N), the process returns to S4. In a case where the measurement is ended (S11: Y), the control unit 11 of the work analysis device 10 records the analysis data of the last set video image range (S12), and the process is ended.

The flow of the work analysis process by the work analysis device 10 is as described above. According to the work analysis device 10 described above, following the delimitation operation for setting the motion delimitation for the video image data 101 obtained by imaging a series of motions performed by the worker, the selection screen 64 for selecting the attribute information to be associated with the video image range delimited by the delimitation operation can be displayed. As a result, it is possible to improve the linkage between the setting of the video image range corresponding to the element motion and the selection of the attribute information for the set video image range, so that it is possible to improve the work efficiency.

In addition, according to the work analysis device 10, it is possible to reduce an amount of movement of the line of sight of the analyst from the playback screen 50 of the video image to the selection screen 64 of the attribute information. Therefore, it is possible to reduce the load of the analyst in a series of flow starting from the delimitation operation to the selection operation of the attribute information, so that it is possible to improve the work efficiency.

In addition, according to the work analysis device 10, it is possible to collectively select the options of a plurality of pieces of the attribute information (type) on the selection screen 64. Therefore, it is possible to reduce the number of times of operations by the analyst, so that it is possible to improve the work efficiency.

In addition, according to the work analysis device 10, by the click operation of the area other than the selection screen 64 on the playback screen 50, the selection of the attribute information by the selection screen 64 can be accepted, and the analysis work of the next motion delimitation can be started. Therefore, it is possible to reduce the number of operations by the analyst, so that it is possible to improve the work efficiency of the analysis work.

In addition, according to the work analysis device 10, by defining the click operation on the playback screen 50 as a delimitation operation, it is possible to allow the analyst to perform the delimitation operation while gazing at the playback display of the video image. As a result, since the analyst can perform the delimitation operation without removing the line of sight from the playback display of the video image, so that the delimitation position can be determined with high accuracy.

In addition, according to the work analysis device 10, the selection screen 64 is displayed at the timing of the delimitation operation, and after the selection of the attribute information by the selection screen 64 is accepted, the selection screen 64 is hidden, so that the selection screen 64 can be displayed only when the selection screen 64 is necessary. As a result, it is possible to increase the screen size, for example, the playback screen, other than the selection screen, so that it is possible to improve the work efficiency of the analyst.

5. Other Embodiments

The present invention is not limited to the above-described embodiments, and various modifications are possible. Hereinafter, Modifications of the embodiment of the present invention will be described.

[5.1. First Modification]

In the embodiment described above, the selection screen 64 is displayed at the timing when the work analysis device 10 receives the delimitation operation. However, for example, as illustrated in a work analysis screen W5 of FIG. 10, at the above-mentioned timing, the selection screen 64 may not be displayed, and the selection screen display button 66 may be displayed.

Then, in a case where the pressing of the selection screen display button 66 is received, the work analysis device 10 may control the selection screen 64 to be displayed. Since the contents of the selection screen 64 may be the same as those illustrated on the work analysis screen W2 of FIG. 3, the description thereof will be omitted.

[5.2. Second Modification]

In addition, the work analysis device 10 may control the display of the selection screen 64 according to the playback speed of the work video image on the playback screen 50. That is, in a case where the playback speed of the work video image on the playback screen 50 is lower than the normal speed, and a predetermined operation (for example, the indication operation such as the click operation) is received, the work analysis device 10 may control the selection screen 64 to be displayed. In a case where the playback speed of the work video image on the playback screen 50 is equal to or more than the normal speed, the work analysis device 10 may control the selection screen 64 not to be displayed.

Specifically, as illustrated in a work analysis screen W6 of FIG. 11, in a case where the playback speed of the work video image on the playback screen 50 is 0.25 times the normal speed, and the click operation on the playback screen 50 is received, the work analysis device 10 may control the selection screen 64 to be displayed. In a case where the playback speed of the work video image on the playback screen 50 is the normal speed (1.0 times) as illustrated in the work analysis screen W1 of FIG. 2, and the click operation on the playback screen 50 is received, the work analysis device 10 may control the selection screen 64 not to be displayed. In this manner, a predetermined operation received in a case where the playback speed of the work video image on the playback screen 50 is less than a threshold value (for example, less than the normal speed) may be treated as the delimitation operation, and a predetermined operation received in a case where the playback speed is equal to or more than the threshold value may not be treated as the delimitation operation. In addition, in a case where the playback speed of the work video image on the playback screen 50 is less than the threshold value, the selection screen 64 may be superimposed and displayed on the playback screen 50. In this case, by allowing the selection screen 64 to be transparently displayed, even while the selection screen 64 is displayed, the display content of the playback screen 50 on which the selection screen 64 is superimposed may be checked.

Thus, according to the work analysis device 10, in a case where there is a high possibility that the analyst is searching for the delimit position as in low speed playback (including frame-by-frame playback) of the video image, it is possible to control so that the selection screen 64 is displayed.

In addition, in the above-described embodiments, the example where the work analysis device 10 is realized by one computer has been described, but the functions provided to the work analysis device 10 may be realized by a computer system including a plurality of computers.

REFERENCE SIGNS LIST

W1, W2, W3, W4, W5, W6: work analysis screen
10: work analysis device
   11: control unit
   12: storage unit
   13: input interface
   14: output interface
20: input device
30: display device
50: playback screen
52: measurement state display area
54: playback speed display area
56: playback operation area
   56A: variable playback position scroll bar
   56B: forward playback button
   56C: pause button
   56D: backward playback button
   56E: speed increase button
   56F: speed decrease button
58: content edit operation area
60: element motion information display area
62: comment entry area
64: selection screen
   64A: selection content display mark
66: selection screen display button
100: data storage unit
   101: video image data
   102: type data
   103: work analysis data
110: video image data acquisition unit
120: display control unit
   121: video image playback unit
   122: selection screen display control unit
130: input reception unit
   131: delimitation operation reception unit
   132: selection operation reception unit
140: storage control unit

The invention claimed is:

1. A work analysis device comprising:
an acquisition unit that acquires a video image obtained by imaging a series of motions performed by a worker;
a reception unit that receives a delimitation operation for setting a motion delimitation in the video image;
a display control unit that executes a process for displaying a selection screen for selecting attribute information to be associated with a video image range delimited by the delimitation operation at a timing when the delimitation operation is received by the reception unit; and
a storage control unit that stores the attribute information selected through the selection screen in association with the video image range.

2. The work analysis device according to claim 1, further comprising a video image playback unit that plays back and displays the video image on a playback screen,
wherein the selection screen is displayed to be superimposed on at least a portion of the playback screen.

3. The work analysis device according to claim 2,
wherein a list of options for each of a plurality of pieces of the attribute information is displayed on the selection screen,
wherein the work analysis device further comprises a selection operation reception unit for receiving selection of an option from the list of options for each of the plurality of pieces of the attribute information displayed on the selection screen, and
wherein the storage control unit stores the option received by the selection operation reception unit in association with the video image range.

4. The work analysis device according to claim 3, wherein, in a case where an indication operation of indicating at least a portion of an area of the playback screen other than the selection screen is received, the storage control unit stores the option received by the selection operation reception unit in association with the video image range.

5. The work analysis device according to claim 4, wherein the video image playback unit stops the playback and display of the video image in a case where the delimitation operation is received and resumes the playback and display of the video image in a case where the indication operation of indicating at least a portion of an area of the playback screen other than the selection screen is received.

6. The work analysis device according to claim 2, wherein the delimitation operation is an indication operation of indicating at least a portion of the playback screen while the video image is played back and displayed on the playback screen.

7. The work analysis device according to claim 1 wherein after the attribute information selected on the basis of the selection screen is stored in association with the video image range, the display control unit sets the selection screen to be hidden.

8. The work analysis device according to claim 2,
wherein the video image playback unit can play back the video image at a variable speed, and
wherein the display control unit executes the process for displaying the selection screen at a timing when the predetermined operation is received while the video image is played back at a speed lower than a normal speed.

9. A work analysis method implemented by a computer, comprising the steps of:
the computer acquiring a video image obtained by imaging a series of motions performed by a worker;
the computer receiving a delimitation operation for setting a motion delimitation in the video image;
the computer executing a process for displaying a selection screen for selecting attribute information to be associated with a video image range delimited by the delimitation operation at a timing when the delimitation operation is received; and
the computer storing the attribute information selected through the selection screen in association with the video image range.

10. A computer-readable information storage medium storing a program for causing a computer to function as:
an acquisition unit that acquires a video image obtained by imaging a series of motions performed by a worker;
a reception unit that receives a delimitation operation for setting a motion delimitation in the video image;
a display control unit that executes a process for displaying a selection screen for selecting attribute information to be associated with a video image range delimited by the delimitation operation at a timing when the delimitation operation is received by the reception unit; and a storage control unit that stores the attribute information selected through the selection screen in association with the video image range.

\* \* \* \* \*